United States Patent [19]

Yascheritsyn et al.

[11] 4,213,358
[45] Jul. 22, 1980

[54] ROTARY CUTTING TOOL

[76] Inventors: Petr I. Yascheritsyn, Leninsky prospekt, 18, kv. 102; Valery A. Sidorenko, Leninsky prospekt, 14, kv. 3; Evgeny I. Morgunsky, ulitsa Malaya, 15, kv. 1; Nikolai V. Vishnev, ulitsa Karastoyanovoi, 23, kv. 82, all of Minsk; Mindaugas N. Bureika, ulitsa Veterinarious, 12, kv. 74, Litovskaya SSR, Ukmerge; Vladimir A. Plotnikov, ulitsa Gikalo, 28, kv. 17, Minsk; Anatoly T. Volkov, ulitsa Krasnaya, 25, kv. 15, Minsk, all of U.S.S.R.

[21] Appl. No.: 943,649

[22] Filed: Sep. 19, 1978

[51] Int. Cl.² .................... B23B 29/00; B26D 1/12
[52] U.S. Cl. .................................. 82/36 R; 407/2; 407/7
[58] Field of Search ................. 82/36 R; 407/2, 7

[56] References Cited

U.S. PATENT DOCUMENTS

| 2,289,167 | 7/1942 | Bannister et al. ............. 407/7 |
| 2,383,958 | 9/1945 | De Vlieg ........................ 407/7 |
| 2,551,167 | 5/1951 | Rolland ......................... 407/7 |
| 2,630,732 | 3/1953 | Piazze ........................... 407/7 |
| 2,800,703 | 7/1957 | Buettner ........................ 407/7 |
| 3,182,534 | 5/1965 | Hoffmann ..................... 82/36 R |
| 3,739,665 | 6/1973 | Kumabe et al. .............. 82/36 R |

*Primary Examiner*—Harrison L. Hinson
*Attorney, Agent, or Firm*—Robert E. Burns; Emmanuel J. Lobato; Bruce L. Adams

[57] ABSTRACT

A rotary cutting tool according to the invention comprises a supporting element secured in the tool body opposite to the cutting zone, said element interacting with the tool spindle and intended to load the spindle with forces which approach closely the cutting forces in magnitude but are opposite to them in direction. The rotary cutting tool according to the invention features high stiffness and resistance to vibration thereby ensuring higher accuracy, quality and efficiency of machining.

4 Claims, 6 Drawing Figures

ROTARY CUTTING TOOL

FIELD OF APPLICATION

The present invention relates to machining of materials by cutting and more particularly, to rotary cutting tools.

The invention will render most efficient service in cutting hard-to-work materials and removing greater amounts of material than is common for rotary cutting, when the tool is subjected to strong cutting forces.

Moreover, the invention can be utilized in dimensional finish-machining of surfaces with high requirements the precision of their geometrical shape and dimensions.

The invention can also be used for intermittent machining when the resistance of the tool to vibration is relatively low, for example in turning and boring the discontinuous surfaces of such parts as splined shafts, rotors and stators of electrical machines, sprockets, gears with splined holes, as well as in milling and planing.

BACKGROUND OF THE INVENTION

Prior to the advent of the rotary cutting tools the interaction of all the previously known tools with the workpiece was accompanied by a sliding friction between the produced chips and the front face of the tool and by a sliding friction between its back surface and the surface of cutting.

It is also common knowledge that the velocity of the relative sliding between the cutting tool and the surface being cut determines to a considerable extent the power expenditures for the process of cutting, the durability of the cutting tool, quality and precision of the machined surface. A reduction in the velocity of relative sliding can be achieved by partly substituting the sliding friction between the tool and the workpiece for rolling motion. This principle has been pursued in devising the rotary cutting tools wherein the cutting portion in the form of a body of revolution, for example a tapered cup, rotates in the course of cutting around it geometrical axis due to interaction with the workpiece or, in some cases, is rotated by a special drive. This permits the life of the rotary cutting tools to be increased many times as compared with the prior art tools, at the same time improving the precision, quality and efficiency of machining.

Alongside with the positive characteristics of the rotary cutting tools, their common disadvantage lies in an insufficient vibration resistance and stiffness which is attributable to the provision in their construction of a rotary element mounted on bearings in the tool body. Therefore, if we consider the stiffness of the entire system "machine tool-jig-tool-workpiece", most often the tool, i.e. the rotary cutting tool will be the weakest link in the process of rotary cutting. Accordingly, the most efficient method of raising the resistance to vibration of the tool and, consequently, its efficiency, precision and quality of the machined surfaces is the perfecting of the design of the rotary cutting tools which raises their stiffness and vibration resistance without substantial increase in dimensions.

Known in the prior art is, for example, a rotary cutting tool whose rotating element is constituted by a spindle which carries a dish-shaped cutting element and is mounted in the tool body on bearing supports. The cantilevered mounting of the cutting element with respect to the bearing supports of the spindle causes the latter to be bent in the course of cutting which, in combination with the contact deformations of the bearings, produces the pressing-away forces which push the tool from the surface of the workpiece.

The magnitude of the pressing-away force varies considerably with the different cutting forces which may change under the effect of varying machining allowances, variations in the physical and mechanical properties of the material being machined, etc. This brings about considerable difficulties in ensuring the high precision of dimensions and shape of the machined surfaces. The variations in the pressing-away force increase the intensity of vibrations during cutting, impair the micro- and macrogeometry of the machined surface. In large-scale production where the possibility of test passes on machine tools is nonexistent, the non-uniformity of the pressing-away forces acting on the rotary cutting tools due to their low stiffness is accompanied by a considerable increase in the spread of dimensions of the workpieces, which decreases the machining accuracy.

SUMMARY OF THE INVENTION

The main object of the present invention resides in providing a rotary cutting tool characterized by a high resistance to vibration.

Another object of the invention resides in providing a rotary cutting tool characterized by a high stiffness.

Still another object of the present invention resides in providing a rotary cutting tool ensuring a high accuracy of machining.

A further object of the present invention resides in providing a rotary cutting tool which would ensure a high quality of machining.

In addition, an object of the invention resides in providing a rotary cutting tool characterized by a high efficiency.

These and other objects are accomplished by providing a rotary cutting tool comprising a body, bearing supports located in said body, a rotating portion made in the form of a spindle installed in said body, a cutting element mounted on said spindle, a supporting element secured in said body opposite to the cutting zone, interacting with said spindle and intended to load said spindle with forces which approach closely the cutting forces in magnitude but are counteropposed to them in direction.

The supporting element permits the bearing supports of the rotary portion of the rotary cutting tool to be preloaded with forces which approach closely the cutting forces in magnitude but are counteropposed to them in direction which, in turn, permits increasing the dynamic stiffness of the tool this being the most essential operational characteristic of the rotary cutting tools. In addition, the provision of the supporting element widens the technological capabilities of the tool with respect to increasing the permissable cutting depth and feed and, consequently, efficiency of the tool. The use of the preloaded rotary cutting tool reduces the resultant forces applied to the rotary portion of the tool which reduces the forces pressing the cutting element away from the workpiece surface thereby improving the precision, quality and efficiency of machining.

The supporting element can take the form of a shackle secured to the face of the body and provided with at least one hole receiving an eccentric pin which carries a bearing interacting with the spindle.

By turning the eccentric pin in the hole of the shackle it is possible to ensure fine adjustment of the loading force applied to the rotary portion of the tool which, under different machining conditions, ensures equality of the loading and cutting forces. As a result, these forces are mutually counterbalanced, the bearings are relieved and the tool body takes only the external load. This ensures better working conditions for the bearing supports, raises their dependability and durability.

It is the best practice to make the supporting element in the form of a ring slipped on the spindle-mounted bearing and acted upon by at least one pressure bolt installed in the body so that its axis intersects the rotation axis of the spindle.

In this case the rotary portion of the tool is preloaded by the pressure bolt which acts on the ring and bearing. The use of a threaded pair instead of the eccentric pin facilitates considerably the provision of a preset load. The use of two pressure bolts facilitates the transmission of a heavy load to the rotary portion of the tool and simplifies orientation of the supporting element with respect to the cutting zone.

If the cutting tool is subjected to a strong load in the course of machining, for example when removing thick machining allowances or cutting high-strength materials, it is practicable that the supporting element should be made self-aligning relative to the rotary portion of the tool, i.e. made in the form of a base one surface of which contacts the bearing mounted on the spindle while the opposite surface is connected, via a joint, with an L.shaped support located in a radial slot of the tool body with a provision for adjusting its position with respect to the rotation axis of the spindle.

The provision of a joint between the L.shaped support and the supporting element in the form of a base allows the latter to perform swinging motions relative to the joint axis so that the loaded supporting element gets self-aligned relative to the spindle axis while the direction of the loading force coincides accurately with the spindle radius. This facilitates the basic requirement of tool preloading, i.e. equal magnitude and opposite directions of the cutting and loading forces.

The surface of the base contacting the bearing can be cylindrical with a radius which is greater than the radius of the bearing outer race.

This ensures linearity of the contact zone between the base and the bearing and permits the base to get self-aligned relative to the bearing thus ensuring a strictly radial direction of the loading force.

The surface of the base contacting the bearing may be V-shaped.

This becomes necessary when the tool is subjected to strong loading forces. In this case heavy contact loads arise at the point of base-to-bearing contact so that with one line of contact this may ruin the bearing rapidly. The V-shape of the base and the self-alignment of the supporting element create two lines of contact between the base and the bearing, thus reducing the contact loads and deformations in the bearing and extending its service life.

BRIEF DESCRIPTION OF THE DRAWINGS

Other objects and advantages of the present invention will be more apparent from the detailed description that follows and the appended drawings, in which.

DESCRIPTION OF THE PREFERRED EMBODIMENTS

Figure 1:
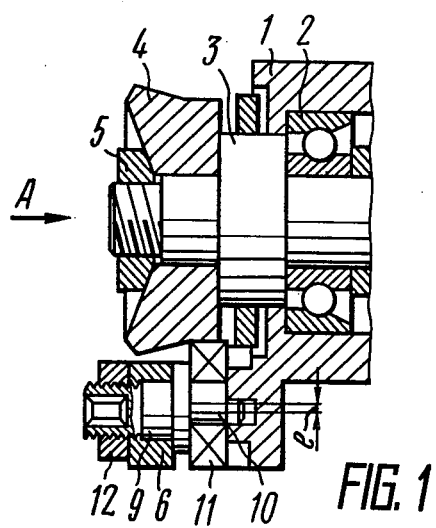
FIG. 1 is a fragmentary longitudinal section view of the rotary cutting tool with the supporting element in the form of a shackle according to the invention.

Disclosure is made of a rotary cutting tool wherein a body 1 (FIG. 1) houses a rotary portion of the tool mounted on a bearing 2 which serves as a front support (a rear bearing support is not shown). The rotary portion has the form of a spindle 3 carrying a dish-shaped cutting element 4 secured on the spindle 3 by a nut 5. According to the invention, the rotary cutting tool incorporates a supporting element intended to load the spindle 3 with forces which approach closely the cutting forces in magnitude but are counteropposed to them in direction. The supporting element is secured in the tool body 1 opposite to the cutting zone and interacts with the spindle 3.

Figure 2:
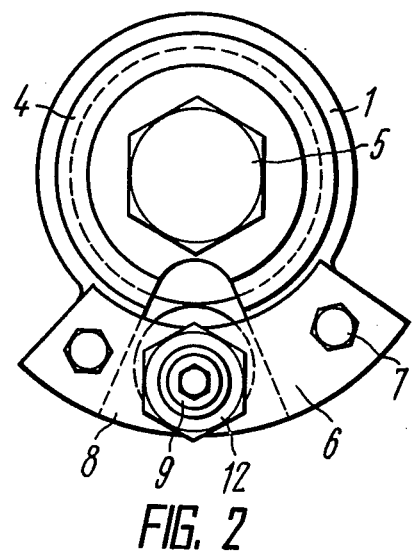
FIG. 2 is an end view of the rotary cutting tool along arrow A in FIG. 1.

In FIG. 2 the supporting element is shown as a shackle 6 fastened at the side of the dish-shaped cutting element 4 to the face of the body 1 with bolts 7. The shackle 6 has a slot 8 and a hole accommodating an eccentric pin 9 whose neck 10 (FIG. 1) carries a bearing 11 interacting with the dish-shaped cutting element 4. The neck 10 is offset from the turning axis of the pin 9 by the value of eccentricity "e". After turning, the pin 9 is fixed in position by a nut 12.

To withstand higher loading forces, the shackle 6 has two and more eccentric pins 9.

The rotary cutting tool with the supporting element in the form of a shackle functions as follows.

The tool is set in the tool holder (not shown in the drawing) of the machine so that the axis of the pin 9 and the cutting zone are diametrically opposite relative to the rotation axis of the spindle 9. The term "cutting zone" should be understood as the point or place of contact between the working edge of the cutting element and the surface of the workpiece. Such an arrangement ensures the opposite directions of the loading force applied from the bearing 11 to the cutting element 4 and arising when the pin 9 turns around its axis on the one hand and the cutting force directed along the radius of the cutting element 4 on the other.

When two and more eccentric pins are used (in case of heavy loading forces), the tool is clamped in the tool holder so that the cutting zone is diametrically opposite to the bisector of the central angle between the radiuses drawn through the turning axes of the eccentric pins 9. The equality of the cutting and loading forces is ensured by adjusting the turning angle of the eccentric pins 9 and checking the displacement of the dish-shaped cutting element 4 during trial passes.

Figure 3:
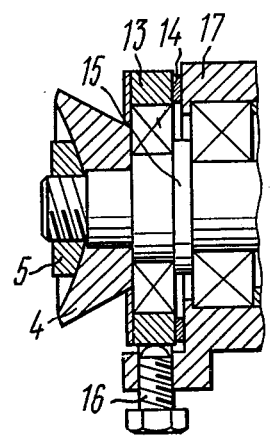
FIG. 3 is a fragmentary longitudinal view of the rotary cutting tool with the supporting element in the form of a ring, according to the invention.

FIG. 3 illustrates another version of the rotary cutting tool whose supporting element has the form of a ring 13 which is slipped on the bearing 14 mounted on the spindle 15 and acted upon by at least one pressure bolt 16. The latter is installed in the tool body 17 so that its axis intersects the rotation axis of the spindle 15.

This rotary cutting tool functions as follows.

The tool is preloaded by the force of a pressure bolt 16 applied to the spindle 15 through the ring 13 and bearing 14. The position of the tool in the tool holder with the use of one or two pressure bolts is similar to the above-described version with eccentric pins.

The design of the supporting element in the form of the ring 13 slipped on the bearing 14 which is mounted on the spindle 15 and acted upon by the pressure bolt 16 housed in the tool body is simpler, it facilitates the setting of the tool and adds to its compactness and lower metal content. Besides, this design rules out completely the ingress of chips between the supporting element 13 and the rotary portion of the tool, i.e. the spindle 15. However, the arrangement of the bearing 14 after the dish-shaped cutting element 4 increases the length of the spindle cantilever, i.e. the distance between its front bearing support and the cutting edge which impairs the tool stiffness somewhat. Therefore, this design of the supporting element is recommended for finish-machining with small allowances.

Figure 4:
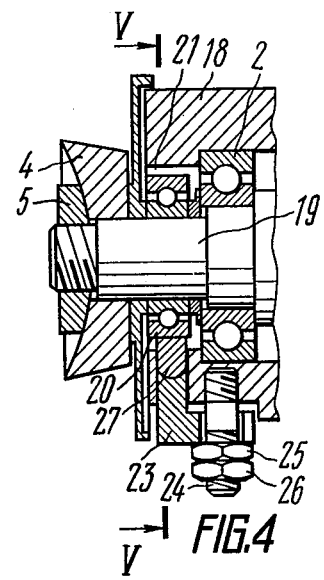
FIG. 4 is a fragmentary longitudinal section view of the rotary cutting tool with the supporting element in the form of a base, according to the invention.
Figure 5:
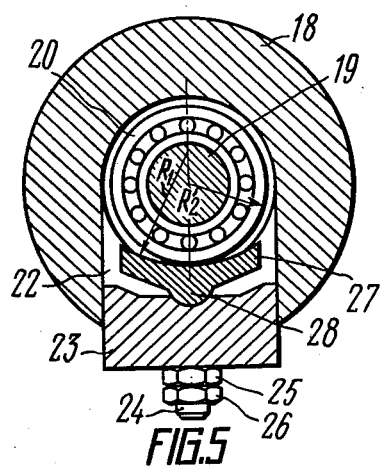
FIG. 5 is a section view taken along section line V—V in FIG. 4.

For removing thicker allowances, working of high-strength materials and for other applications characterized by high cutting forces it is recommended to use the supporting element illustrated in FIGS. 4 and 5. Here the body 18 (FIG. 4) of the tool accommodates a bearing 20 located between the front bearing support 2 of the spindle 19 and the dish-shaped cutting element 4 on the spindle 19 with a clearance 21 between the outer race of said bearing 20 and the hole in the body 18.

The tool body 18 has a radial slot 22 (FIG. 5) which accommodates an L-shaped support 23 installed with a provision for adjusting its position relative to the axis of rotation of the spindle 19 and connected with the body 18 by a stud 24 (FIG. 4), adjusting nut 25 and locknut 26. The supporting element is made in the form of a base 27 one surface of which contacts the outer race of the bearing 20 mounted on the spindle 19 while the opposite surface is connected via the joint 28 with the L-shaped support 23. The surface of the base 27 contacting the bearing 20 is cylindrical with a radius $R_1$ which is greater than the radius $R_2$ of the race of the bearing 20. This ensures linearity of the contact zone between the base 27 and the race of the bearing 20.

This cutting tool functions as follows.

The tool is set up, i.e. the spindle 19 or its rotating portion is loaded with forces which approach closely the cutting force in magnitude but are contrary to it in direction, by tightening nut 25. The support 23 moving in the slot 22 of the body 18 presses the base 27 with a certain force against the outer race of the bearing 20. The spindle 19 is loaded with one force by tightening the nut 25 which facilitates substantially the orientation of the tool relative to the cutting zone when said tool is being installed in the holder. The provision of the joint 28 between the support 23 and the base 27 allows the latter to perform swinging motions relative to the axis of the joint 28 so that the loaded base 27 is self-aligned relative to the axis of the spindle 19 and the direction of the loading force is strictly defined and coincides with the direction of the slot 23 in the body 18, i.e. is radial relative to the spindle 19.

In the first place, it facilitates the set-up of the tool in the tool holder because the cutting zone is located on the same diameter with the slot 22 of the body 18. Secondly, this improves substantially the accuracy of tool preloading: the loading force is one and, due to self-alignment of the supporting element relative to the bearing 20 mounted on the tool spindle 19, the direction of the loading force coincides strictly with the radius of the spindle 19 and, consequently, with the radius of the dish-shaped cutting element 4.

Figure 6:
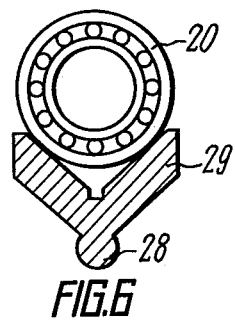
FIG. 6 is a section view of the V-shaped base contacting with the bearing, according to the invention.

FIG. 6 illustrates another version of the base 29 one V-shaped surface of which contacts the outer race of the bearing 20. As distinct from the surface of the base 27 shown in FIG. 5 there are two lines of contact between the outer race of the bearing 20 and the surface of the base 29. This reduces the contact loads between the base 29 and the bearing 20, decreases the contact deformations of the bodies of revolution and races of the bearing 20, thus extending its service life. Accordingly, the V-shaped surface of the base 29 is recommended for operations characterized by strong forces applied to the rotary cutting tool, for example in intermittent machining (milling, planing), removal of thick allowances and cutting of hard-to-work materials.

The prelcading of the spindle 19 or of the rotating portion of the rotary cutting tool by the forces which approach in magnitude the forces applied to the dish-shaped cutting element 4 makes it possible to increase the dynamic stiffness of the tool, to rule out the development of vibrations which impair its durability and accuracy and quality of machining, to reduce the probable pressing-away of the cutting edge, all the more so when cutting hard-to-work materials and thus to improve the accuracy and quality of machining. In turn, this widens the technological capabilities of the tool with respect to increasing the permissible cutting depth and feed and, consequently, steps up efficiency. Besides, the possibility of adjusting the stiffness of the tool to suit the loads arising in the course of cutting makes it possible to relieve the bearings and, therefore, to improve their working conditions, raise their dependability and durability.

What we claim is:

1. A cutting tool with a freely rotating cutting edge comprising:
    (1) a body having a leading end portion and a trailing end portion;
    (2) bearing supports located in said leading end portion;
    (3) rotatable spindle means having an axis of rotation and having bearing means rotatably mounted in said bearing supports;
    (4) a cutting element having a continuous cutting edge mounted on said spindle for rotation therewith about said axis,
    (5) said cutting edge having a portion thereof at said leading end and on one side of said axis,
    (6) said portion of said cutting edge defining a cutting zone, and
    (7) a spindle support means connected to said body on another side of said axis toward said trailing end and having pressure-applying means directed toward said leading end in order to counter pressure cutting forces on said spindle during machining operations to thereby subdue vibratory influences on said spindle and said cutting element.

2. A cutting tool with a freely rotating cutting edge according to claim 1, in which said pressure-applying means comprises a ring on said bearing means, a bolt for variably applying pressure to the bearing supports, and said bolt having a longitudinal axis in a plane intersecting an axis of rotation of said spindle.

3. A cutting tool with a freely rotating cutting edge according to claim 1, in which said pressure-applying means comprises means for variably applying pressure on the bearing means for adjusting an axis thereof relative to an axis of rotation of said spindle.

4. A cutting tool with a freely rotating cutting edge according to claim 1, in which said pressure-applying means comprises means mounted on said leading end portion of said body, and an eccentric pin carrying said bearing means.

* * * * *